United States Patent [19]

Wayman et al.

[11] Patent Number: 4,693,404
[45] Date of Patent: Sep. 15, 1987

[54] MAINS BURSTING TOOL

[75] Inventors: Malcolm Wayman, Darras Hall; Geoffrey I. Mood, Whitley Bay, both of England

[73] Assignee: British Gas Corporation, England

[21] Appl. No.: 810,245

[22] Filed: Dec. 18, 1985

[30] Foreign Application Priority Data

Jan. 10, 1985 [GB] United Kingdom ............... 8500565
Feb. 27, 1985 [GB] United Kingdom ............... 8505093
May 8, 1985 [GB] United Kingdom ............... 8511646

[51] Int. Cl.$^4$ ........................... B23P 17/02; B26F 3/00
[52] U.S. Cl. ........................................ 225/103; 83/180; 138/97; 166/55.3; 405/156
[58] Field of Search ............... 225/103, 93; 83/180; 405/156; 138/97; 166/55.3

[56] References Cited

U.S. PATENT DOCUMENTS

| | | | |
|---|---|---|---|
| 1,588,200 | 6/1926 | Skelton | 83/180 X |
| 1,785,419 | 12/1930 | Moss | 166/55.3 |
| 2,884,066 | 4/1959 | Teplitz et al. | 83/180 X |
| 3,181,302 | 5/1965 | Lindsay | 405/156 |
| 3,185,225 | 5/1965 | Ginies | |
| 3,301,337 | 1/1967 | Vaughn et al. | 166/55.3 X |
| 4,190,293 | 2/1980 | Nieder | 125/23 R X |
| 4,505,302 | 3/1985 | Streatfield et al. | 225/103 X |

FOREIGN PATENT DOCUMENTS

| | | |
|---|---|---|
| 0086567 | 8/1983 | European Pat. Off. . |
| 2122299 | 1/1984 | United Kingdom . |
| 2138532 | 10/1984 | United Kingdom . |
| 2137719 | 10/1984 | United Kingdom . |
| 2137220 | 10/1984 | United Kingdom . |
| 2139938 | 11/1984 | United Kingdom . |
| 2153040 | 8/1985 | United Kingdom . |
| 2152624 | 8/1985 | United Kingdom . |

Primary Examiner—Frank T. Yost
Attorney, Agent, or Firm—Larson and Taylor

[57] ABSTRACT

A tool has a hollow elongated body 10 made up of a leading section 12 attachable to a tow-cable by a clevis 28, an intermediate section 14 and a trailing section 20 housing a hydraulic cylinder 24 and attachable to a main liner 30. The intermediate section includes a frusto-conical wall in two parts 16 and 18, each of 180° angular extent. The ram 24 operates a wedge 22 longitudinally to move the first part 16 outwardly or inwardly transversely of the body. The parts 16, 18 are slidably trapped to the wedge by slide components projecting into grooves. The tool is pulled by the two cable into the main with the part 16 retracted. Then the part 16 is moved outwardly to burst and enlarge the main, allowing the tool to advance further after retraction of the part 16. The parts 16, 18 each have an external longitudinal rib 68, 70. The part 16 has longitudinal marginal extensions overlapping the longitudinal margins of the part 18.

8 Claims, 5 Drawing Figures

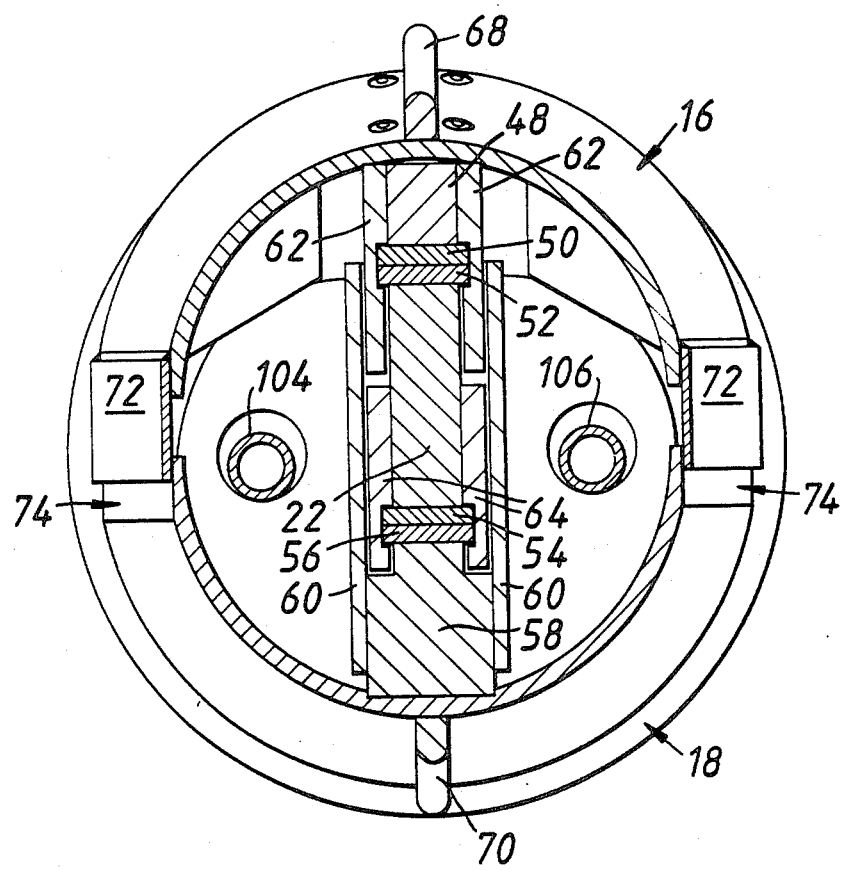

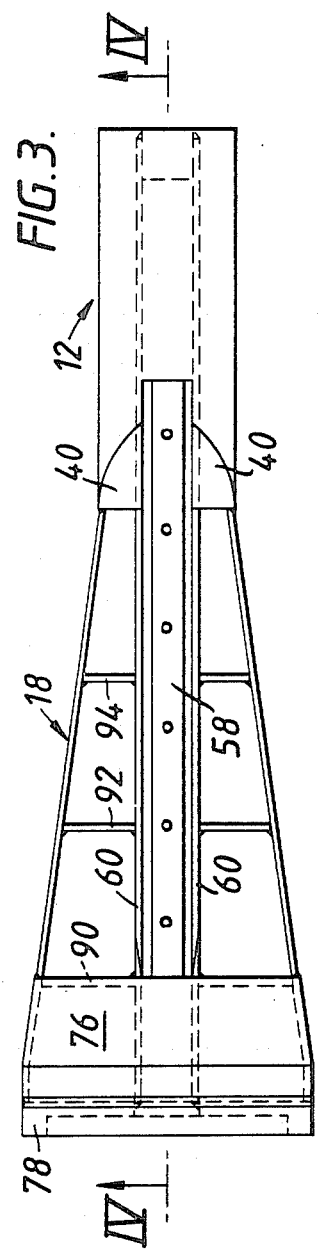
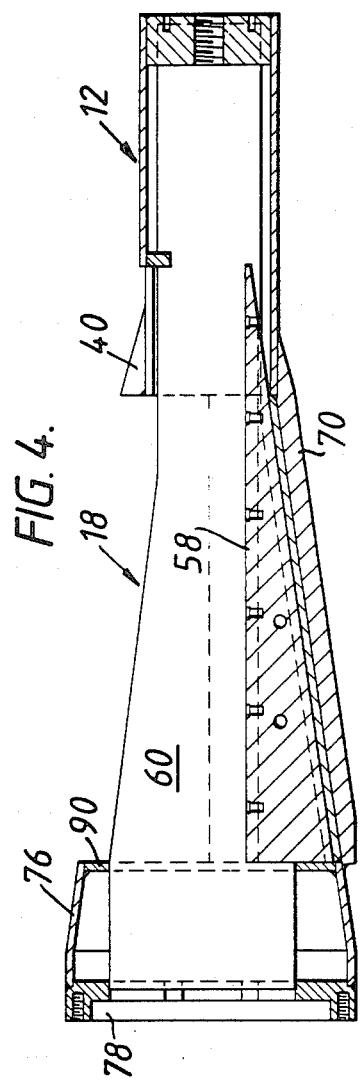

MAINS BURSTING TOOL

The invention relates to main bursting tools particularly, though not exclusively, such tools for bursting gas, water or sewer mains.

One form of main bursting tool described in U.S. Pat. No. 4,505,302 has been used which consists of a body which is drawn through the main by a cable and which includes a percussive mechanism operable to subject the main to repeated impacts. The tool has a relatively narrow blade which is pivotally connected at its leading end to the tool body and which is angularly displaceable outwardly and inwardly by a hydraulic cylinder. The blade is intended to cut through main joints by outward displacement. Such a tool has been found to be ineffective in bursting mains of some constructions and in certain types of ground. A similar form of tool has been proposed in British patent application Publication No. 2139938A in which a pneumatic hammer strikes pivotal blades.

Another form of tool has been proposed in U.S. Pat. No. 4,487,052 for use in correcting mis-alignment or reduced cross-section of sewer pipes so that the original internal diameter is restored. Side-loads acting on the displaceable elements and on the wedge which displaces the elements are transferred to the piston rod of the hydraulic cylinder which moves the wedge. Accordingly, the cylinder assembly is subjected to bending loads which could be prejudicial to the life or proper working of the tool.

It is the object of the invention to provide a main bursting tool by which the drawbacks of the previously used or proposed tools are reduced or eliminated.

A main bursting tool, according to the invention, comprises an elongated body, first and second means for attaching the body, respectively, to a towing device and to a liner, said body comprising a section which has an outer wall divided longitudinally into at least two parts, said body having first bearing surface means, at least one of said parts having second bearing surface means, a wedge positioned between said first and second bearing surface means and having mutually inclined face means in sliding engagement respectively with said first and second bearing surface means, a hydraulic cylinder comprising a cylinder tube and a piston therein connected to said wedge and operable to move said wedge longitudinally of said body to cause said at least one part to move rectilinearly transversely of said body, said cylinder tube being mounted on said body in fixed relationship to said first bearing surface means, and said outer wall of said section always having an outer shape tapering towards a leading end of said body.

Preferably, said second part extends forwardly from an annular portion of the wall of the body.

Preferably, each of said first and second parts is of 180° circumferential extent.

An embodiment of the invention will now be described by way of example with reference to the accompanying drawings, in which:

FIG. 1A together with FIG. 1B is a longitudinal vertical section through the main bursting tool;

FIG. 2 is a vertical section on the line II—II in FIG. 1;

FIG. 3 is a plan of part of the body of the tool shown in FIGS. 1 and 2; and

FIG. 4 is a vertical section on the line IV—IV in FIG. 3.

Figure 1A:
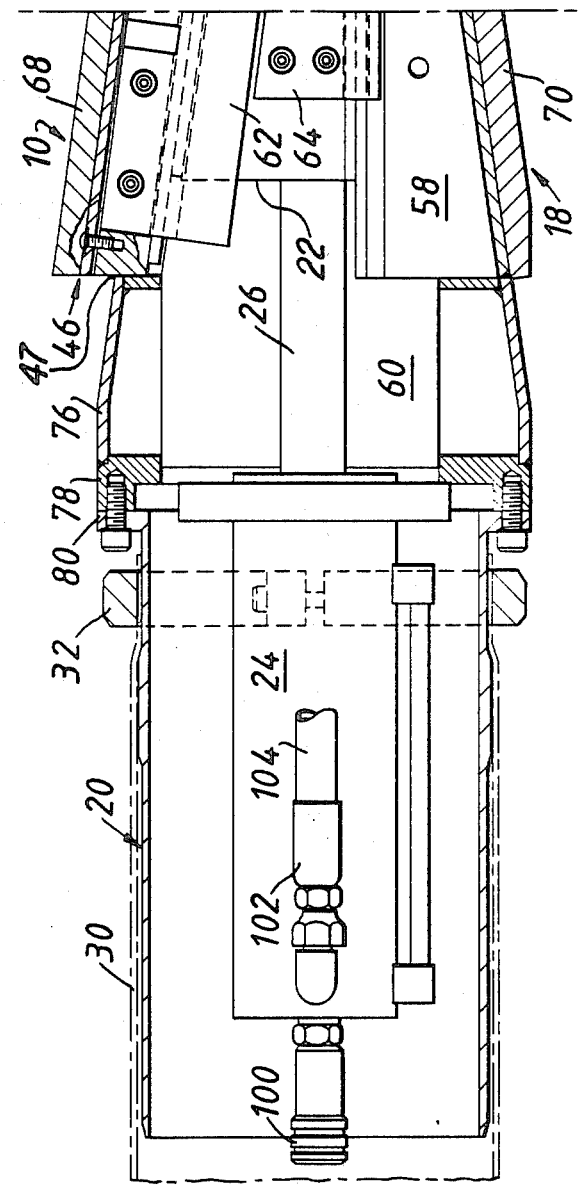

The tool shown in the drawings consists of the following principal components: a body 10 made up of three sections namely, a leading cylindrical section 12, an intermediate section 14 having a wall of frusto-conical shape and made up of a first part 16 and a second part 18; a cylindrical trailing section 20; a wedge 22 arranged between the parts 16 and 18; and a hydraulic cylinder 24 housed in the trailing section 20 and having a piston rod 26 connected to the wedge 22.

The tool is towed through the main to be burst by a towing device such as a self-advancing mechanism which can "walk" inside the main or by a towing device in the form of a cable connected to a winch. The cable or other device is attached to a clevis 28 secured to the leading end of the leading section 12. The tool forms an enlarged cavity in the ground and draws into the cavity a polyethylene or similar tubular liner 30 which extends over the trailing section 20 and which is secured to it by a clamp 32. Alternatively, the liner may be made up of tubular lengths of polyvinyl-chloride interconnected, for example, by inter-engaged socket end formations and a cable passed through the lengths, or by some other means. The liner assembly is secured to the tool by the cable or some other means.

The leading section 12 and the intermediate section 14 are of welded steel, fabricated construction. Alternatively, they may be of cast construction. The leading section 12 is a hollow cylinder which accomodates the leading end of the wedge 22 when it is advanced beyond the smaller diameter end of the intermediate section 14. The leading section 12 has an opening in its wall at its trailing end which receive the leading end of the first part 16 of the intermediate section 14 (FIG. 4). At each side of the opening the trailing portion of the leading section 12 carries a shroud 40. The two shrouds 40 shroud the leading edge 42 of a wall 44 of the first part 16.

The wall 44 is of part-frusto-conical shape and forms 180° of the circumference of the intermediate section 14 between the smaller-diameter end of the section 14 and the trailing end 46 of the wall 44. The wall 44 is carried by an inner elongate support 48 having an inner bearing pad 50 slidably engaging a bearing pad 52 on the upper side of the wedge 22. The member 48 is movably accommodated between the shrouds 40.

The lower side of the wedge 22 has a bearing pad 54 slidably engaging a bearing pad 56 carried by a counter-support 58. The support 58 is secured to the second part 18 of the intermediate section 14.

The support 58 is positioned between two side-plates 60, which extend right through the intermediate section 14 and the leading section 12 and which accommodate the wedge 22 between them.

The outer margins of the support pads 50, 52 are trapped in sliding engagement in opposed grooves in a pair of plates 62 secured to respective opposite sides of the member 48. The pads 54, 56 are similarly trapped in opposed grooves in a pair of plates 64 secured to respective opposite sides of the wedge 22. In that way, the first part 16 is obliged to retract inwardly when the wedge 22 is retracted leftwards, from the outer position of FIG. 1.

The member 48 carries a short outer rib 66 as a continuation of a rib 68 formed on the outside of the wall 44. The leading end of the rib 66 does not protrude beyond the outer surface of the leading section 12 even in the outer position of the part 16 shown in FIG. 1. The part 18 has an outer rib 70 diametrally opposite the rib 68. Such ribs are optional.

The first part 16 has at each side margin an extension strip 72 welded to its outer surface (FIG. 2). The inner surfaces of the strips 72 slide on plane marginal surfaces 74 of the lower, second part 18. The intermediate section 14 includes an annular, generally frusto-conical wall portion 76. The second part 18 of the wall of the section 14 is secured to, and extends forwardly from the leading edge of the wall portion 76. The trailing edge of the portion 76 is secured to a circular plate 78, which has an approximately cruciform opening. The trailing section 20 is a steel cylinder and has a leading, external flange 80 secured by bolts to the plate 78. The hydraulic cylinder 24 has a forward flange secured to the plate 78. The trailing ends of the side-plates 60 are received in the opening in the plate 78 and are secured to the plate. The plate 78 may be considered as the frame for the main bursting tool, wherein the other fixed parts are secured and fixed relative thereto, and the transversely movable parts are moveable relative thereto.

The side-plates 60 are braced by transverse plates 90, 92 and 94, which are secured to the side-plates and to the portion 76 or the second part 18. At their leading ends, the side-plates 60 are secured to the inside surface of the leading section 12.

The cylinder 24 has connections such as 100 by which fluid can be conveyed from and to a power pack (not shown) via conduits extending through the liner 30. When the tool is towed by a self-propelled device, further connections such as 102 enable fluid to be conveyed to the cylinders of the towing device via conduits 104, 106 passing through the body 10 and out through apertures (not shown) through the leading end of the leading section 12.

When the tool is towed (as is preferred) by a two cable only hydraulic connections to the cylinder are required. In that case the leading section is preferably modified from that shown to provide a tapered lug to which a D-shaped shackle is connected by a pin.

OPERATION

Assuming the tool is to be towed by a cable and winch, the cable is fed through a section of existing buried main, the ends of which have been exposed by excavation. In the case of gas distribution systems, the main will be made of cast iron, ductile iron or asbestos-based material. Other mains, such as those for water or sewage, for example, are made of cast iron, clay or vitreous ceramic material. The tool is applicable to bursting all such types of main. The winch is preferably a hydraulically-driven winch accommodated in the excavation at the end of the main so that the cable passes in a straight line out of the main to the winch barrel.

One end of the relatively thin liner 30, in the case of a polyethylene liner, is fitted over the trailing section 20 and attached to it by the clamp 32. The cable is attached to the body 10 and the winch is operated to draw the tool into engagement with the end of the main. The first part 16 is retracted at this stage. Next, the cylinder 24 is operated to advance the wedge 22 which forces the first part 16 outwardly. Typically, for example, hydraulic pressures up to 207 bar (3000 lbs. per sq. inch) are used to develop forces up to 36 Tonnes exerted by the first and second parts 16, 18 upon the main and the surrounding ground. The outward movement of the part 16 bursts the main and partly enlarges the cavity in the ground.

Next, the part 16 is retracted and the tool advances as far as possible under the load applied by the mechanism, such as a cable, which advances the tool. In so doing, the parts 16 and 18 and the frusto-conical wall portion 76 further enlarge the partially enlarged part of the cavity just referred to. The fragments of the previously-broken main are thus pushed outwardly into the surrounding soil.

A typical cast iron main has a nominal inside diameter of, for example, 150 millimeters (6 inches) and the diameter of the fully-expanded cavity formed by the tool is 240 mm (9.5 inches) to receive a liner 30 of 202 mm (8 inches) outside diameter. The same tool can also be used, when suitably designed, to burst mains having inside diameters of 127 mm (5 inches), 178 mm (7 inches) or 203 mm (8 inches). The tool made in a different size will burst mains having) inside diameters of 102 mm (4 inches) or 127 mm (5 inches) for example.

Where the winch can be set to operate at a constant pressure, the winch can be effectively self-controlling so that relatively little, if any, action is required by the operator to control the winch. The tool advances while resistance is low, i.e., after the first part 16 has been retracted following a bursting action. The cable tension keeps the tool in engagement with the unburst main. The actions described above are repeated, the first part 16 successively advancing and retracting and the tool being progressively advanced by the cable tension as the main is burst and expanded.

The winch must be capable of providing sufficient cable tension to overcome the frictional resistance experienced by the tool and the liner, if any, connected to the tool.

The facts that the parts 16 and 18 represent almost the whole of the frusto-conical intermediate section 14 and that the first part 16 advances outwardly bodily relative to the part 18 mean that the whole of each part 16, 18, including both ends of the part, is effective in bursting the main and enlarging the cavity formed. The action of the two parts 16, 18, upon the surrounding broken main and adjacent ground, as they are relatively separated by the wedge is more efficient in bursting the main and expanding the cavity than the action of hinged members of known kind or of a tapered body forced through the cavity.

Figure 1B:
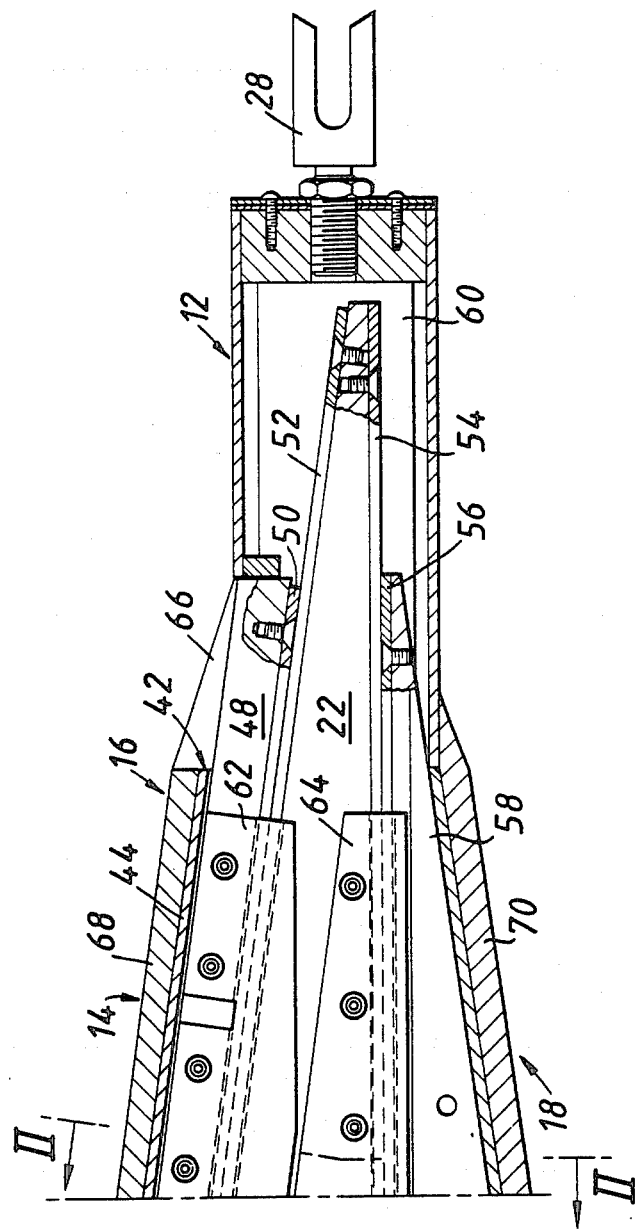

The first part 16 is shown in FIG. 1 in its fully-advanced position, in which the transverse dimension between the trailing edge 46 and the diametrically opposite point of the wall parts 16, 18, of the body 10, i.e., excluding the ribs 68 and 70, is the same as the maximum outer diameter of the wall portion 76. This fact, with the relatively reduced diameter of the trailing section 20 considerably relieves the liner 30 of frictional forces during operation.

After the liner 30 has been pulled through the burst main the tool is released from the liner 30. A new main typically of plastic material such as polyethylene is pulled through the liner 30, which protects the outer surface of the main from abrasion and scratches.

Alternatively, the liner and the new main arranged within the liner are both attached to the tool and pulled through the enlarged cavity together. As a further alternative, typically in sewer main replacement replacement for example, only a new main is attached to the tool and pulled through the cavity, no separate liner being used. The new main itself then constitutes the sole liner and in this specification the term "liner" means either a main itself or a liner through which the new main passes or will pass.

The body 10 is of strong construction and includes the counter-support 58 on which the bearing pad 56 is mounted. The cylinder 24 is mounted at one end, cantilever-wide upon the plate 78. Bending loads and side loads acting on the body are borne by the strong body and reacted within it. For example, side-loads acting on the first and second parts 16, 18 are reacted through the wedge 22. The bearing surface provided by the pad 56 for the wedge 22 accordingly prevents side and bending loads acting on the body from being imposed on the cylinder 24.

In a modification (not shown) both the first and second parts are movable, for example two parts each of 180° extent with overlap provided at the side edges by extension strips. The wedge slides between the two parts.

In such a modification, the body has a spine member rigidly secured to the portion 76. The spine member corresponds to the counter-support 58 and is slidingly engaged at its bearing pad by the wedge. Thus, side-loads and being loads acting on the body are prevented by the spine member from being imposed on the cylinder assembly.

In the retracted position of the first part 16, the wall 44 is a frusto-conical continuation of the wall of the portion 76. A bulk-head is formed by a transverse plate 47 inside the first part 16 adjacent the rear end of the wall 44 and close to the portion 76, so that when the first part is advanced there is no open gap between the wall 44 and the portion 76.

The first and second parts 16, 18, the leading section 12 and the wall portion 76 provide a virtually closed housing in fixed relation to the tube of the cylinder 24. The wedge 22 and exposed part of the piston rod 26 are shielded by that housing at all times during operation, whether the first part 16 is advanced or retracted.

In further modifications (not shown):
(i) The frusto-conical wall 76 is replaced by a cylindrical wall and the diameter across the trailing ends of the parts 16, 18 in their fully closed position is the same as the diameter of the cylindrical wall, for example, 240 mm. Optionally, the length of the wall is increased in comparison with the length shown in the drawings.
(ii) The intermediate section 14, instead of having a circular cross-section throughout in the closed position of the parts 16, 18, changes from circular section at its trailing end to elliptical section at its leading end. The minor axis of the ellipse is in that case vertical in a sectional view corresponding to FIG. 2. The diameter of the leading cylindrical section is preferably equal to the major ellipse axis at the leading end of the intermediate section so that the leading section shrouds the leading ends of the blades 68, 70. The shroud 40 is dispensed with.

Either a plane wall part or a fairing closes the gap between the trailing end of the leading section and the elliptical wall of the intermediate section.

This modification increases the effectiveness of the separation movement of the parts 16, 18 in bursting the main and enlarging the cavity. The cross-section of the intermediate section changes from the elliptical shape in the closed relative position of the parts 16, 18 to a substantially circular shape in the separated relative position of the parts when the wedge is advanced.

We claim:

1. A main bursting tool comprising a body having an elongated shape having a leading end and including a tapered portion which tapers towards said leading end, said body comprising a side-wall assembly partly defining said shape, said assembly comprising in said tapered portion two mutually complementary wall parts together totalling the entire circumferential extent of the tapered portion, at least one of said two parts being a movable part capable of rectilinear reciprocation so as to expand and contract said tapered portion, said at least one movable part having surfaces remaining in close relationship with adjacent surfaces on said assembly notwithstanding said reciprocation, and said tool further comprising operating means comprising hydraulic cylinder means operable to effect said reciprocation, said operating means being supported by said body in a relationship which relieves said hydraulic cylinder means of side and bending loads.

2. A main bursting tool comprising a body having an elongated shape having a leading end and including a tapered portion which tapers towards said leading end, said body comprising a side-wall assembly partly defining said shape, said assembly comprising in said tapered portion mutually complementary wall means totalling the entire circumferential extent of the tapered portion, including movable wall means capable of rectilinear reciprocation so as to expand and contract said tapered portion, said assembly including marginal structure eliminating gaps in said assembly adjacent margins of said movable wall means, and operating means comprising hydraulic cylinder means operable to effect said reciprocation, said operating means being supported by said body in a relationship which relieves said hydraulic cylinder means of side and bending loads.

3. A tool according to claim 2, said body comprising a support, said cylinder means having a central longitudinal axis extending parallel to the lengthwise direction of the tool, said cylinder comprising a cylinder tube having a leading end mounted on said support, said cylinder tube extending rearwardly therefrom in cantilever fashion, said tool further comprising first bearing surface means on said body extending parallel to said lengthwise direction, second bearing surface means on said movable wall means inclined relatively to said first bearing surface means, and wedge means having first and second face means in sliding engagement, respectively, with said first and second bearing surface means, said cylinder means comprising a piston in said cylinder tube, and a piston rod connecting said piston to said wedge means.

4. A main bursting tool comprising a body having an elongated shape having a leading end and including a tapered portion which tapers towards said leading end, said body comprising a side-wall assembly partly defining said shape, said assembly comprising in said tapered portion two mutually complementary wall parts totalling the entire circumferential extent of the tapered portion, at least one of said wall parts being a movable wall part capable of rectilinear reciprocation so as to expand and contract said tapered portion, said assembly including marginal structure eliminating gaps in said assembly adjacent margins of said at least one movable wall part, and operating means enclosed by said assembly, including hydraulic cylinder means and force transmitting means in force transmitting relationship between said cylinder means and said at least one movable wall part, said operating means being supported by said body so as to relieve said cylinder means of side and bending loads.

5. A tool according to claim 4, said two mutually complementary wall parts comprising a first wall part which is movable and a second wall part which is fixed in relation to said body.

6. A tool according to claim 5, said first and said second wall parts each being substantially of 180° circumferential extent and each having two longitudinal boundaries adjacent respective longitudinal boundaries of the other, said marginal structure comprising at each pair of said adjacent longitudinal boundaries a marginal extension on one of said wall parts overlapping the adjacent margin of the other of said wall parts.

7. A tool according to claim 4, said tool further comprising first bearing surface means on said body and second bearing surface means on said at least one movable wall part, said force transmitting means comprising wedge means having mutually inclined face means in sliding engagement, respectively, with said first and second bearing surface means.

8. A tool according to claim 4, the maximum transverse dimension of said tapered portion in its expanded condition being greater than the maximum diametral dimension of any other portion of the shape of the tool.

* * * * *